United States Patent [19]

Reid

[11] 4,160,569

[45] Jul. 10, 1979

[54] BEARING SUPPORT FOR A LIFT PUMP

[75] Inventor: Robert A. Reid, Charlton City, Mass.

[73] Assignee: CPC Engineering Corporation, Sturbridge, Mass.

[21] Appl. No.: 925,306

[22] Filed: Jul. 17, 1978

Related U.S. Application Data

[63] Continuation of Ser. No. 792,705, May 2, 1977, abandoned.

[51] Int. Cl.² .............................................. F16C 13/04
[52] U.S. Cl. ..................................... 308/203; 248/130; 308/73; 308/184 A; 415/73
[58] Field of Search ................... 308/184 A, 203, 6 R, 308/204, 63, 205, 15, 20, 135, 73, 72, 64, 74, 75, 27, 212, 157, 207, 202, 29, 33, 31, 32, 18, 2 R, 184 R; 214/340, 339; 248/130; 29/116 R; 188/250 B, 74, 75, 76, 52; 415/72, 73; 416/177; 198/672–673

[56] References Cited

U.S. PATENT DOCUMENTS

| | | | |
|---|---|---|---|
| 1,618,338 | 2/1927 | Hoffman | 308/203 |
| 1,943,049 | 1/1934 | Weckstein | 308/203 |
| 2,399,189 | 4/1946 | Johnson | 308/203 |
| 2,447,605 | 8/1948 | Treshow | 308/73 |
| 3,220,524 | 11/1965 | Puidokas | 308/2 R X |

*Primary Examiner*—Douglas C. Butler
*Attorney, Agent, or Firm*—Eugene E. Geoffrey, Jr.

[57] ABSTRACT

A bearing structure for supporting at least one end of the cylindrical housing of a cylindrical lift pump for handling large volumes of fluid, particularly sewage, and, in particular, to bearings for carrying the load of the pump which bearings include at least two supports for engaging a wear ring or track carried by the cylinder with each support disposed on opposite sides of a vertical axis bisecting the cylindrical housing and having at least two coplanar rollers carried by a first base member which is in turn pivotally carried by a second fixedly positioned base member for tri-axial motion relative thereto.

3 Claims, 2 Drawing Figures

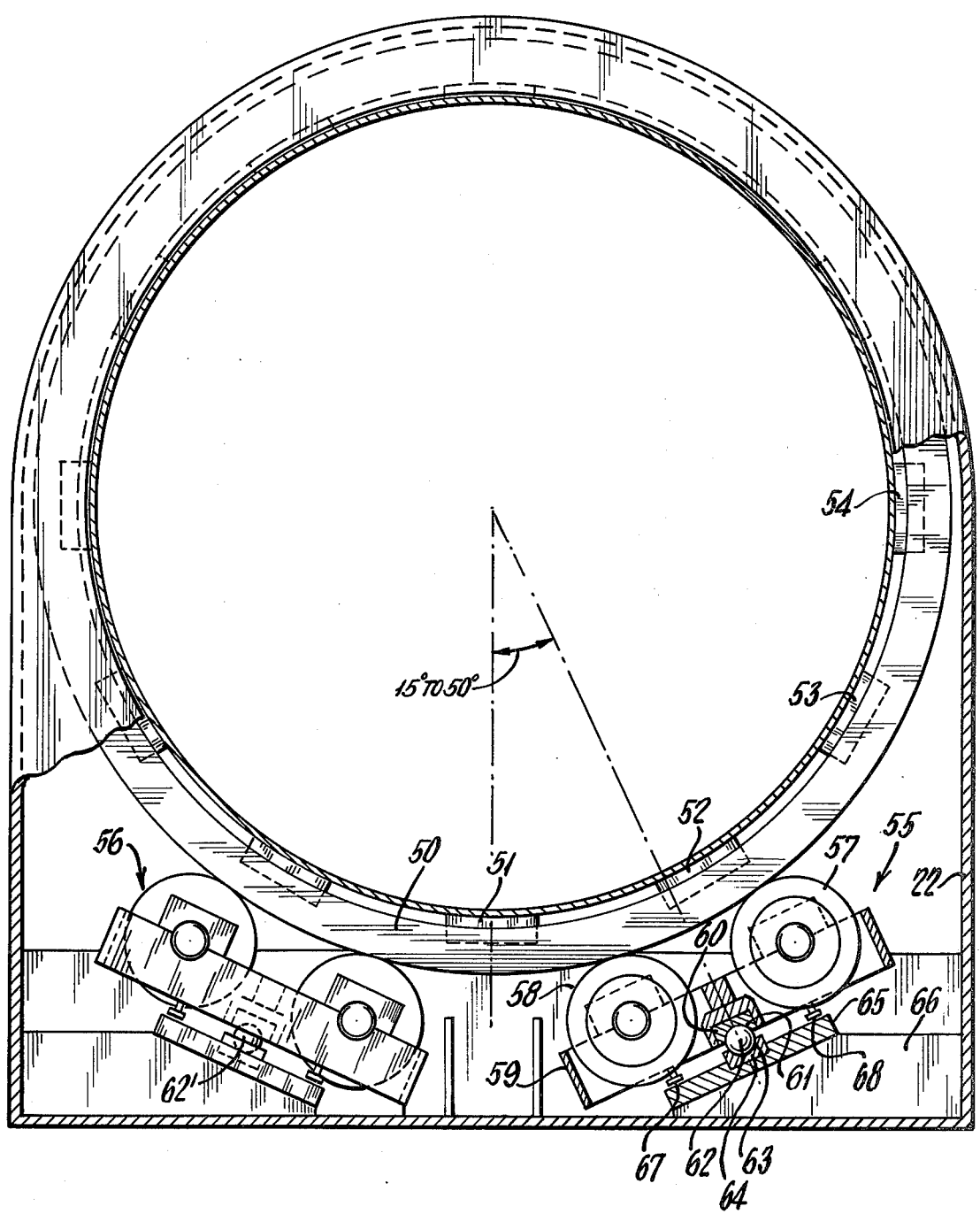

BEARING SUPPORT FOR A LIFT PUMP

This application is a continuation of application Ser. No. 792,705 filed May 2, 1977, now abandoned.

BACKGROUND OF THE INVENTION

In the handling of large volumes of liquid, specifically, sewage, special problems occur in the pumping which make impossible use of conventional fluid pumps. A modern development has been a return to extreme basics in the form of refinements of the Archimedes screw for lifting the liquids from one level to another. The screw has the advantage that it is of large diameter. The path through it is roomy so that relatively large lumps of solid matter can be carried through it even after the original gate screening at the entrance to the sewage plant. A form of improvement of the Archimedes screw is exemplified in my U.S. Pat. No. 4,019,830, granted Apr. 26, 1977, for a cone pump, wherein an improvement in internal flight design together with improvements in the pick up and discharging of fluid are shown. In a massive mechanical structure of this type which may run 36, 42 or 48 inches in diameter, or more, the volumes of water handled by weight, create problems of supporting the body of the cylinder and make it behave like a beam. Bearing problems are caused by the weight of the pump itself; it is compounded when it is full of liquid.

It is, accordingly, an object of this invention to address the problem of bearings for the body of a screw type fluid pump and to provide specifically constructed bearings for use in such structure.

Other objects and advantages of the invention will in part be obvious and in part appear hereinafter.

DETAILED DESCRIPTION OF THE INVENTION

The invention is in the bearing seat for the lower end of the body of cylindrical type of screw type, wherein it characteristically is formed of at least a pair of roller bearings on which rides the wear ring or track of the body of the cylinder, the lower bearings contacted the wear ring or track and transmitting the load through a steel ball or pivot point in its own base to the supporting base. Preferably, two pairs of roller bearings are used in the typical installation so that load distribution is more uniform to the support base.

The basic points of the structure involving the four roller bearings to take the load of the body and transmit it to point of the base support is to give the bearing for the body of cylinder a self-aligning property so that the free running body on the wear ring or track maintains an accurate alignment in its diagonal lift and maintains continuous contact with the bearings.

Detailed understanding of the invention may be had by references to the following drawings and the specification wherein;

FIG. 2 is a section on the line 2—2 of the roller bearings showing the relationship of the detailed structure of the lower bearings to the wear ring or track of the body of the cylinder.

THEORETICAL BACKGROUND

Figure 1:
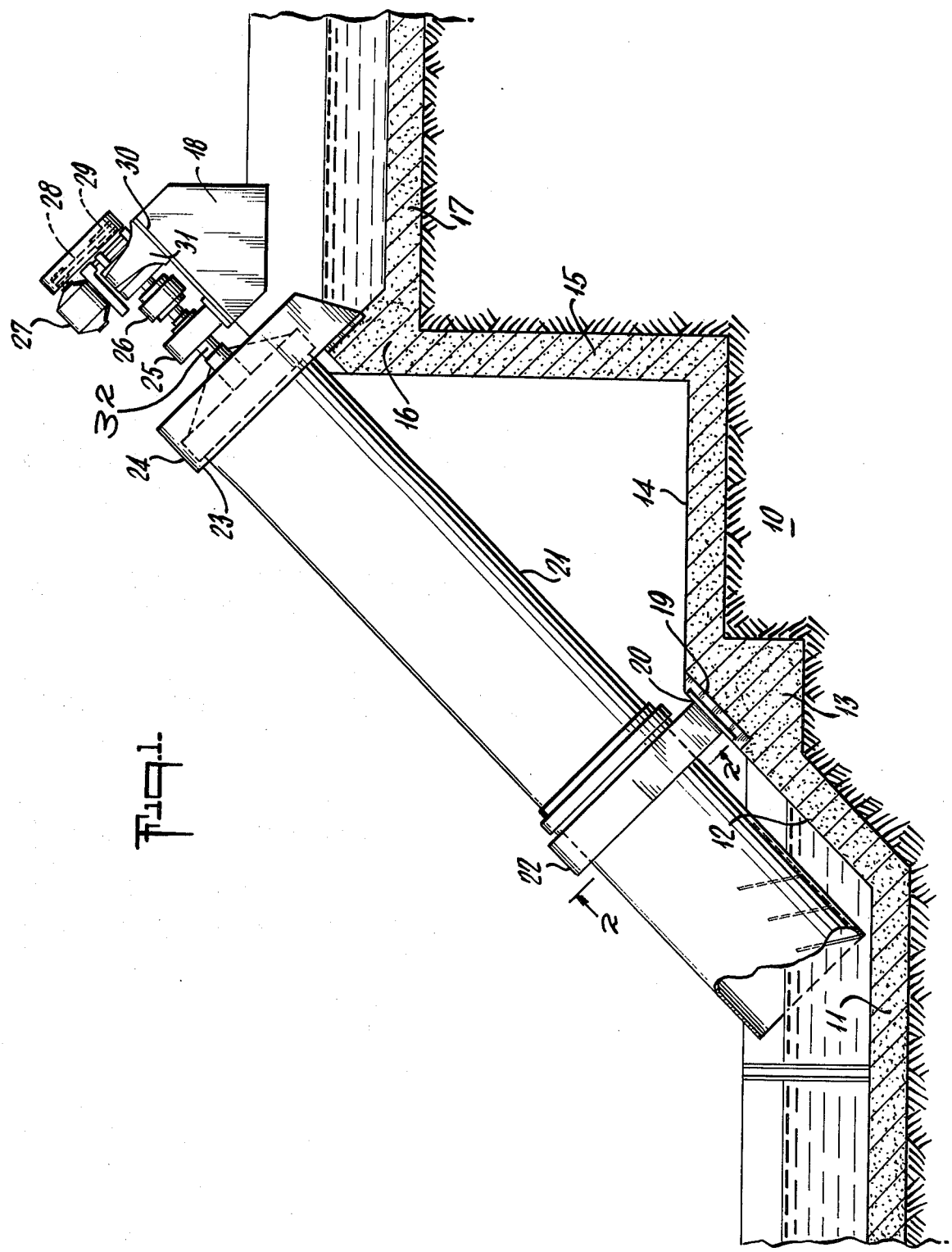
FIG. 1 is front elevation of the general layout of the screw pump in relation to inlet basin for sewage and the outlet basin at the higher level at which it discharges.

It is helpful to an understanding of bearing construction to explore some of the theoretical background involving the surface stresses developed when a roller contacts a large cylinder under load.

The surface stress which occurs when a roller contacts a large cylinder under load may be calculated from the following formula:

$$S = .591 \sqrt{P_1 E \left( \frac{D_1 + D_2}{D_1 \ D_2} \right)}$$

S = Surface stress
$D_1$ = Diameter of Cylinder
$D_2$ = Diameter of Roller
$P_1$ = Load ÷ Face Length From this formula it can be seen that surface stress varies with relative diameters of the roller and cylinder and with the length of the line of contact between both parts.

For this formula to apply in actual design work, it is essential that provisions be made to insure that cylinder and roller are in uniform contact across the face. Any deviation in the parallelism of the axis will result in a condition which approaches a point contact rather than a line contact and will thus lead to an extreme stress concentration.

When it becomes necessary to support a large cylinder on rollers, it is difficult to maintain the required alignment at roller surfaces. It can be seen that any deflection of the cylinder caused by cylinder weight or external loads results in loss of the line contact at the roller(s). If cylinder is subject to heating from one side such as would occur if left in sunlight, unequal expansion will again cause misalignment. Some low load situations permit slight crowning of the surface of roller(s) to eliminate the alignment problem. However, because crowning causes a point contact at roller surface, this is not practical when higher loads exist.

Another problem exists when, due to high loads, more than two rollers must be used to support a large cylinder. Two fixed center rollers act as a cradle for a large cylinder and each roller supports an equal load. Addition of more fixed rollers results in a four-point support and any change in the diamater of cylinder will result in unequal loading of the four rollers. Indeed it becomes almost impossible to evenly distribute the load to all rollers.

The bearing constituting this invention solves both the alignment problem and the problem of distributing load equally in multiple roller applications. It can be seen that each pair of rollers is mounted in a common carriage which is set on a ball pivot or other means of pivot centrally located. The carriage is free to float and to align in all directions. The curvature of the large cylinder causes rollers to track without using side flanges. Each roller carries an equal load regardless of changes in diameter and rollers remain in line contact even if the large cylinder deflects under load. Run-out of large cylinder due to uneven heating presents no problems as once again, rollers can dynamically self-align. Axial expansion of cylinder due to temperature change cannot cause bearing damage, as the wear ring surface is free to slide on rollers. In addition, it is not necessary to maintain extremely close tolerance on the outside diameter of large cylinder, i.e., cylinder could vary in diameter or even be slightly elliptical and rollers would still maintain the required line contact.

The term "wear ring" as used herein is a name generally used in the art to define an annular ring or track affixed to a large cylindrical structure and which ring or track contacts supporting rollers for rotatably supporting at least one end of the cylindrical structure.

Referring to the drawings for details of the invention, FIG. 1 is a front elevation and profile of the installation, 10 is the base or ground in which the installation is made, faced by the horizontal concrete liner 11, which is the bottom of the inlet basin, characterized by a diagonal end 12; with a load bearing footing 13, another horizontal section 14, vertical base 15 to the side 16 of the outlet basin with the bottom 17. Here a support 18 is built on the ground above the side of the outlet basin. This portion of the structure is merely necessary to the installation to accommodate the pump and will vary in detail from one installation to the next. It is generally conventional reinforced concrete construction.

Mounted in the support is the base plate 19, 20 for the lower bearing carrying the body 21 of the cylindrical pump in the bearing and wear ring structure housed within the structure 22.

At the upper end is the inner lip seal 23, anti-spatter guard 24, and upper bearing 25, a flexible coupling 26, drive motor 27, belt drive 28, back stop 29, and mounting plate 30, with gear reducer 31. These are necessary parts of an installation for bringing motive power to the pump and represent a typical manner of assembling the power unit for connection to the shaft 32 of the pump.

So much of the pump can be considered conventional, but it is a necessary part of the total installation for use in the sewage plant. It is by driving the pump that the inlet end takes up fluid and by means of a screw lift takes it up the incline to the outlet basin where it is discharged.

The details of the roller bearing housed in unit 22 are shown in FIG. 2, which is a straight section through the pump along the line 2—2 of FIG. 1.

Referring now to FIG. 2, the housing 22 encloses the entire drum including the wear ring 50 which is attached to the drum. This can be done by simple "L" shaped members 51, 52, 53, 54, etc. welded to the drum and its outstanding portion bolted to the wear ring. The wear ring rests on lower bearings indicated overall as 55, 56. These are symmetrical and the details of construction of one are applicable to the other. Thus, the wear ring rests on rollers 57, 58 which are carried in base 59. In the base is upper seat 60 carrying a semispherical depression 61 to receive ball 62, which in turn rests in semi-spherical depression 63 in lower seat 64, which is mounted in base 65 and 66. The roller bearing is mounted at an angle of approximately 15° to 50° as indicated. Thus, as two rollers in contact with the wear ring of the cylindrical pump, it could be directly under the vertical diameter of the pump and thus receive all the thrust of the weight of the cylinder. However, by providing a symmetrical twin bearing and oppositely oriented angle of incline, the same as bearing 55, the wear ring of the cylinder thus has two pairs of roller bearings on which to run.

Taken symmetrically about the drum the wear ring can thus be supported by the roller bearing carriages and since each one reduces to a single point contact, its alignment is maintained with the wear ring of the cylinder.

It will be thus apparent that the upper end of the pump cylinder can be supported on another self-aligning bearing and that the single point supports 62 and 62' provide through its thrust take-up ball a means for allowing the beam or the pump body to be self-aligning on the bearings. Thus, minor distortion in the drum will have no affect on the alignment because the bearing is self-adjusted.

The bearings are self-adjustable in the amount of play to allow through adjustment screws 67 and 68 and their counterparts in bearing 56.

In operation it will be seen that if the drum is set in rotary motion there can be variations in the form of longitidunal wobble on its axis. The bearing is self-aligning, taking up the tangential contact between the wear ring and the rollers with no difficulty. The continuous contact with all four bearings will be held. A distortion of the cylinder likewise will not upset the alignment because the cylinder can actually be distorted to elliptical cross section and obtain good operation and good contact with the bearings. The cylinder can also expand or contract along its axis without damage to the bearing because wear ring surface is free to slide on the surface of the rollers.

The ball 62 mating with spherical depressions 61 and 63 as shown in FIG. 2 is intended to illustrate one means of creating a single point pivot. It is, however, recognized that other methods such as a conventional universal joint could also be employed.

What is claimed is:

1. In a cylindrical lift pump for liquids, sewage and the like having an elongated cylindrical housing, a screw fixed within the housing and support means on at least one end thereof for rotatably maintaining said pump in a selected axial position and means for rotating said cylindrical housing, a roller bearing support for cooperating with said support means for maintaining said pump in a selected inclined position, said roller bearing support comprising an annular ring surrounding and secured to said cylindrical housing, a first base member, a pair of spaced axially aligned rollers carried on one side of said first base member, said first base member having a hemispherical socket formed in the other side thereof, a second fixedly supported base member having a hemispherical socket therein, a ball bearing in engagement with both of said sockets, and said ring resting on said rollers whereby said rollers support said cylindrical housing and maintain engagement with said ring during rotation thereof without the need for flanges or other guiding means and are dynamically self-aligned with the ring and maintain line contact therewith notwithstanding deviations of said ring from a true cylindrical surface.

2. In a cylindrical lift pump according to claim 1 including a second roller bearing support radially displaced from the first said roller bearing support, said roller bearing supports being symmetrically disposed on opposite sides of a vertical axis bisecting said cylindrical housing.

3. In a cylindrical lift pump according to claim 2 wherein said means for rotating said cylindrical housing is affixed to the upper end of said pump and maintains said pump in said selected axial position and said roller bearing supports are positioned in spaced relationship to the other end of said pump.

* * * * *